Aug. 9, 1966 G. S. DONEV 3,265,178
PARKING METER FOR PREPAID PARKING AND USER IDENTIFICATION
Filed Feb. 5, 1965 2 Sheets-Sheet 1
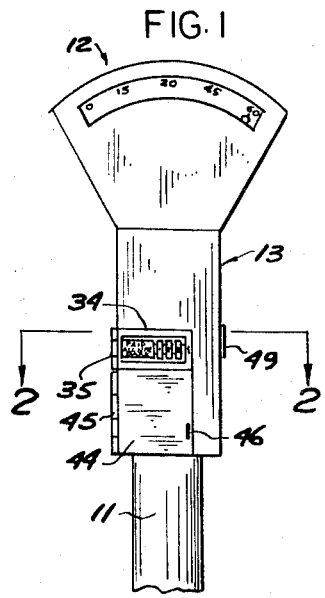
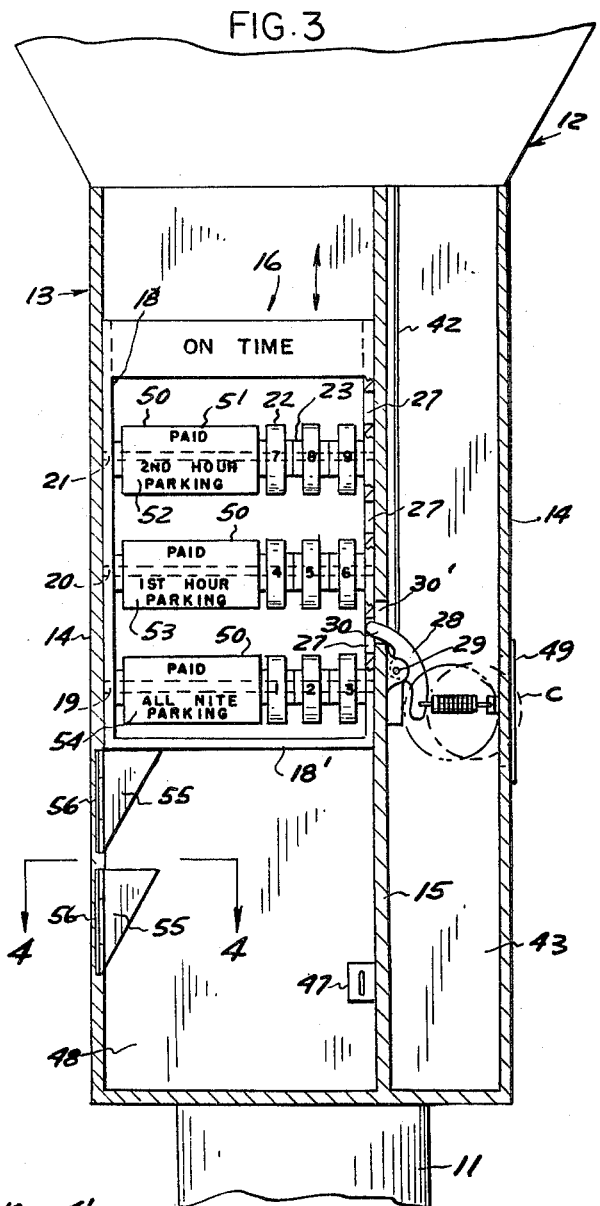
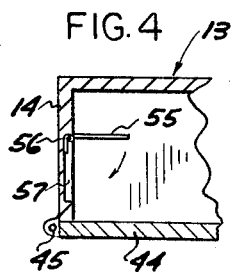
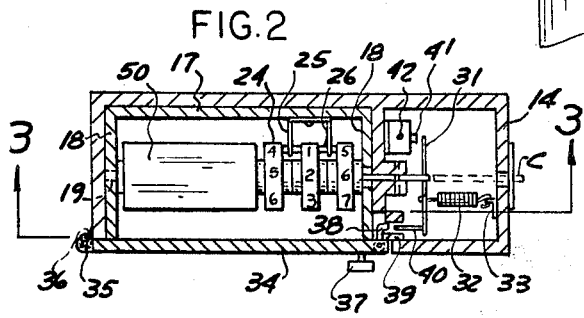
INVENTOR
GEORGE S. DONEV
BY Cullen, Sloman & Cantor
ATTORNEYS Aug. 9, 1966            G. S. DONEV            3,265,178
PARKING METER FOR PREPAID PARKING AND USER IDENTIFICATION
Filed Feb. 5, 1965            2 Sheets-Sheet 2
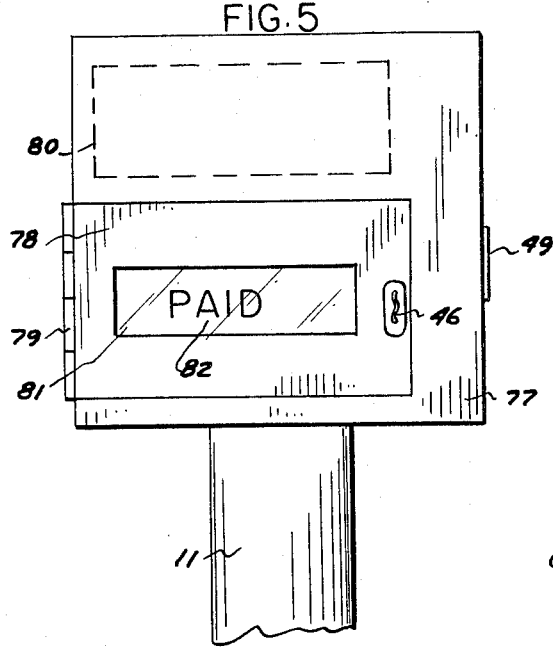
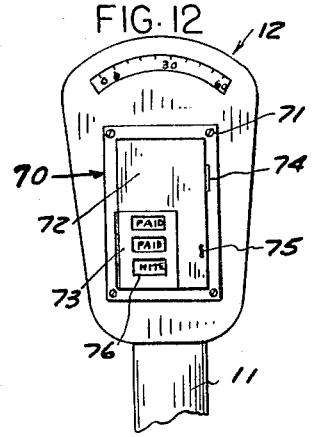
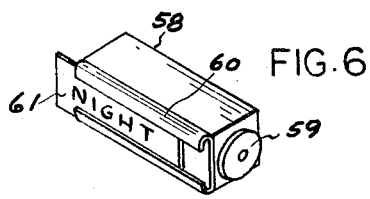
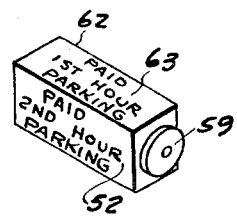
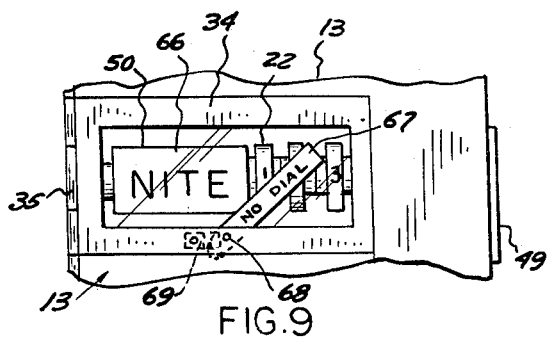
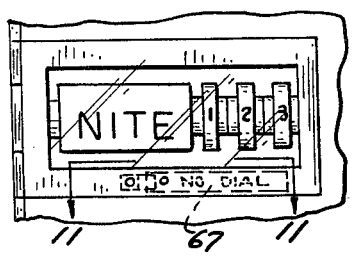
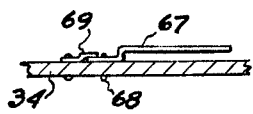
INVENTOR
GEORGE S. DONEV
BY Callen, Sloman & Cantor
ATTORNEYS United States Patent Office 3,265,178
Patented August 9, 1966

3,265,178
PARKING METER FOR PREPAID PARKING
AND USER IDENTIFICATION
George S. Donev, 24312 Annapolis, Dearborn 9, Mich.
Filed Feb. 5, 1965, Ser. No. 430,545
7 Claims. (Cl. 194—54)

The present invention relates to parking meters and, more particularly, to a customer identification device for use therewith for use in connection with a customer actuated, pre-paid parking indicating mechanism to visibly indicate the nature and extent of said pre-paid parking.

The present invention is an improvement over my United States Patent No. 3,157,263, dated November 17, 1964, entitled "Parking Meter with User Identification."

The primary objective in the above cited patent was to provide a means by which paid parkers could identify themselves with a license number of their car and to, thus, eliminate a second party using the unexpired period of someone who had previously paid for parking.

In the above noted patent a means was provided by which application of a proper coin, access to the interior of the housing associated with the parking meter provided a means by which the user could turn one of a series of wheels carrying indicia for showing through a window on the door the number corresponding to some or all of the numbers on the license plate of the parked vehicle.

To carry this a step forward the present invention provides an improved construction by which in addition to the user identification means, the parking meter assembly may include a means by which there is employed a customer actuated pre-paid parking indicating mechanism also mounted within the housing and variably adjustable therein to visibly indicate the nature and extent of the pre-paid parking.

It is another object of the present invention to provide a latching means in conjunction with the normally closed window-door by which opening of the door may be prevented by proper authority and wherein the application of a coin will initially actuate the meter assembly to show that pre-paid parking has been paid for without identification of the parked car. This would be particularly useful for all night parking in areas where parking was permitted and also could provide a means by which parking could be pre-paid for the first hour in the morning after pre-paid all-night parking or could be pre-paid for the second hour after all night pre-paid parking to, thus, provide a means by which the user would not have to rush out from a hotel or motel to apply an additional coin for a permitted amount of pre-paid morning parking.

It is a further object to provide a stop means in connection with the slidable frame within the housing by which the amount of pre-paid parking may be limited by duly constituted authority.

It is another object of this present invention to provide a means by which the meter is employed permitting pre-paid parking with no customer identification, but merely a means upon which the application of one or more coins pre-paid parking can be indicated in nature and extent.

These and other objects will be seen following specifications and claims in conjunction with the appended drawings in which:

FIG. 1 is a fragmentary, elevational view of a conventional parking meter to which the present combination customer-identification and pre-paid parking indicating means is employed.

FIG. 2 is a section taken in the direction of arrows 2—2 of FIG. 1, and on an increased scale.

FIG. 3 is a fragmentary, elevational section of the parking meter construction taken in the direction of arrows 3—3 of FIG. 2.

FIG. 4 is a fragmentary section taken on line 4—4 of FIG. 3.

FIG. 5 is a fragmentary, elevational view of a modification.

FIG. 6 is a perspective view of a rotative body forming a part of the pre-paid parking indicating mechanism.

FIG. 7 is a perspective view of such rotative body indicating indicia directly applied thereto.

FIG. 8 is a similar view showing different indicia applied thereto.

FIG. 9 is a fragmentary, elevational view corresponding to a portion of FIG. 1 showing a latching means for preventing opening of the windowed door.

FIG. 10 is a similar view with the latching means disengaged.

FIG. 11 is a fragementary section taken on line 11—11 of FIG. 10.

FIG. 12 is a fragmentary, elevational view of an independently operable pre-paid parking indicating mechanism applied to a conventional parking meter.

It will be understood that the above drawings illustrate merely preferred embodiments of the invention and that other embodiments are contemplated within the scope of the claims hereafter set forth.

Referring to the drawings, the present parking meter includes pedestal 11 mounting parking meter 12 of conventional form. As disclosed in my Patent 3,157,263, the customer identification device includes houisng 13 mounted on pedestal 11 with sidewalls 14 and upright partition 15 defining chamber 48, FIG. 3, within which is adjustably mounted an elongated frame 16.

ADJUSTABLE FRAME

The frame includes rear wall 17, side walls 18, and bottom wall 18'. A series of vertically spaced parallel supports 19, 20 and 21 are mounted at their ends upon side walls 18. Each support has mounted thereon a series of parallel, spaced wheels 22 with suitable spacers or hubs 23 interposed. Each wheel has formed on its outer peripheral surface a series of indicia or numerals, such as the numerals 1 through 10, best shown in FIGS. 2 and 3, as at 24.

A friction braking device is provided in the nature of a clip 25 rearwardly of each support anchored to rear wall 17. Each clip includes at its free ends the inwardly projecting friction elements 26 adapted to frictionally engage the sides of the respective wheels 22 to limit rotary movements and to retain the wheels in particular manually adjusted positions.

Within the inner upright side wall 18 of frame 16 there are a series of vertically spaced transverse apertures 27, which are adjacent partition 15 and adapted for alternate registry with the transverse slot 30' formed in said partition.

The detent 28 is centrally and pivotally mounted at 29 upon the far side of partition 15 so that its free end 30 projects movably through slot 30' and selectively into one of the slots 27 in frame wall 18 for supporting said frame in a desired vertically adjusted position. Bar 31 is secured to and extends transversely of detent 28, FIGS. 2 and 3, and is normally urged rearwardly to maintain the detent in the frame supporting position shown by coil spring 32 anchored at 33 to housing side wall 14.

HINGED DOOR WITH WINDOW

The front wall of housing 13 is suitably apertured, and mounted within said aperture is the windowed door 34 hinged thereto at 35 and incorporating a coiled spring 36 within the hinge assembly normally biasing door 34 to the closed position shown in FIG. 2.

Said door, which is normally locked by latch 38 engageable with a portion of housing 13 as at 39, FIG. 2, includes a handle 37 by which the door may be opened by the user once the latch has been disengaged.

For this purpose a plunger 40 is mounted adjacent one end of bar 31 and is normally in lateral registry with the flexible end portion of latch 38. Upon application of a coin C through coin receiver 49, FIGS. 2 and 3, said coin is effective for projecting detent 28 inwardly at its lower end. Bar 31 in turn projects plunger 40 so as to deflect the latch 38 disengaging the same so that door 34 may be manually opened. The door is located opposed from shaft 19, FIG. 3.

OPERATION

In normal operation before coin C is inserted, detent 28 is supportably engaging frame 16, that is under bottom wall 18', with the frame elevated from the position shown in FIG. 3. Upon projection of the coin within receiver 49, said coin operatively engages detent 28 below its pivotal mounting 29 causing a pivotal clockwise movement thereof against the action of coil spring 32 momentarily disconnecting the detent end portion 30 from frame 16 permitting said frame 16 to fall a short distance by gravity.

Since coin C immediately drops into chamber 43 in the said housing, the detent is free to return under the action of the spring so as to supportably engage the frame 16 through the adjacent aperture 27 as shown in FIG. 3.

During this process, namely the introduction of coin C, plate 31 and plunger 40 have been projected inwardly disengaging latch 38 permitting manual opening of door 34.

With the door open the customer manually turns the individual wheels 22 on support 19 so that his license number appears at the window at the front of the housing, FIG. 1, to thus provide a ready identification of the customer who has paid for parking.

When the coin is projected inwardly, bar 31 is actuated to engage contact 41 or other operating member causing a longitudinal movement of the meter control member 42 which is connected with the meter in any suitable fashion for cocking the same, such as to the unexpired position shown in FIG. 1.

A second door 44 is mounted upon the front of housing 13 by hinges 45 and is provided with a lock and/or key opening 46 in registry with stop 47 on partition 15, FIG. 3, by which the housing may be opened by an officer from time to time who carries a key for the purpose of resetting frame 16, such as to the position shown in FIG. 3 or to a position wherein the set of wheels on support 19 is elevated above the position shown in FIG. 3.

Each time a customer seeks to park at the meter, and a coin is projected thereinto at 49, detent 28 is activated to again release frame 16 which falls by gravity a short distance until the next succeeding set of wheels, such as on support 20, is presented to the window of door 34. This continues until all the sets of wheels have been utilized, such as those on support 21.

While a limited number of roll supports 19, 20 and 21 have been shown for illustration, it is contemplated that any number of supports and corresponding series of wheels could be provided as desired.

The invention therefore is primarily directed to a means by which a person parking at a meter may dial an identification of the parked vehicle by turning the wheels manually to the identification of his license number, for illustration.

The simplest form would merely provide a dial upon the interior of a locked windowed door which may be opened upon projection of the coin, for dialing manually the particular number. This could be accomplished using one set of rolls, or a plurality of rolls on the vertically adjustable frame 16.

THE IMPROVEMENTS OVER MY U.S. PATENT NO. 3,157,263

The improvement over my prior patent is particularly directed to the use of my parking meter or a slight modification thereof wherein there is incorporated a customer actuated prepaid parking indicating mechanism which may or may not be associated with a customer identification mechanism.

Accordingly, the improved construction provides upon each of the supports' 19, 20 and 21 adjacent wheels 22 an elongated, rotative body 50 bearing indicia 51 reading "PAID" and the indicia "SECOND HOUR PARKING" as at 52. Another rotative body thereunder may include the indicia 53 which reads "PAID FIRST HOUR PARKING" and further a rotative body thereunder may have indicia 54 thereon reading "PAID ALL NIGHT PARKING."

Accordingly, in those areas where all night parking is permitted a driver may apply a coin C so that the detent 28 is momentarily disengaged from the frame 16 permitting it to drop to the position shown in FIG. 3 and so the bottom most indicia 54 will be read through the window-door 34, FIG. 1. Should the parker wish to also pay for the first hour of permitted morning parking, such as from 8 to 9 a.m., he would insert an additional coin to reactivate the mechanism momentarily disengaging detent 28 so that the frame 16 would drop by gravity an additional short distance so that the indicia 53 would then appear at the window 34. FIG. 1. Additionally, and to the extent permitted by law, the parker could put in an additional coin which would prepay not only for all night, but which would include the second hour of morning parking so that the third set of indicia, 51 and 52, would show up at the window 34. This would indicate to an officer checking meters that all night has been prepaid and that, in addition, there had been prepaid parking for the first two hours.

In certain areas, however, perhaps only all night parking would be permitted or perhaps only one hour of the morning. This can be provided for by providing a stop element 55 within the housing 13 below the frame 16 hinged as at 56, FIG. 3, and when not in use could be moved within a recess 57 in the wall 14 of the housing so as to not obstruct downward movement of the frame 16. The officer could, for example, rotate the first or uppermost stop 55 to the position shown in FIG. 3, thus, the application of a second coin C to the meter would be ineffective to permit the frame 16 to drop beyond the position shown in FIG. 3 so that there is indicated only prepayment of all night parking showing through the windowed door 34.

Alternately, only the lowermost stop 55 could be used which would limit the user to pre-paid first hour parking after pre-paid all night parking. The rotative bodies 50 shown in FIG. 3 could be constructed as shown in FIG. 6 as at 58, having an axial bore and stop means 59 for mounting upon one of the supports 19, 20 and 21, and including an elongated channel 60 adapted to removably receive interchangeable indicia cards 61, which can contain different information as for example, "PAID", "NIGHT", "PAID FIRST HOUR", "PAID SECOND HOUR". A modified, rotatable body is shown at 62, FIG. 8, including a series of faces upon which indicia such as indicia 63 is applied reading, "PAID FIRST HOUR PARKING" or indicia 52, "PAID SECOND HOUR PARKING". Thus, there would be a matter of selection in rotating the body 63 as desired.

A modified rotative body is shown at 64, FIG. 7 providing indicia 65 on one side reading "PAID" and indicia 66 on another selectively positionable side reading "NITE".

Accordingly, the present improved device can be used not only for customer identification of paid parking, but for prepaid parking. In situations where there is allowed the use of meters for prepaid night parking, it may well be that the authorities are not interested in the identification of the user, and, accordingly, can provide a means by which that portion of the device directed to parker identification can be deactivated.

For this purpose a latching device is shown at 67, FIGS. 9, 10 and 11, pivoted to housing 13 at 68 and in the position shown in FIG. 9 is retainingly engaged by detent 69 upon the interior of hinged door 34. Thus, with latch 67 tilted to the "no dial" position indicated through window door 34 the application of coins may be employed merely for prepaid parking without user identification since the door remains locked or latched. With latch 67 tilted to the dotted line position of FIG. 10, the door is again free to open and the customer can identify his parked car if he wishes or as may be required for his own protection.

A modification is shown in FIG. 12 wherein the present prepaid parking indicating mechanism is shown as a unit at 70 secured upon parking meter 12 by fasteners 71. Unit 70 includes housing 72 corresponding to housing 13, FIG. 3, which includes hinged door 73, locked at 75 and including a plurality of windows 76 for viewing the series of bodies 50 with indicia 51, 52, 53 and 54 as in FIG. 3. Coin slot 74 is provided. The construction is the same as shown in FIG. 3 except that the parking device is so limited to prepaid parking. For example, employing windows 76 and with all three of the bodies 50 showing therethrough, it is clear to the officer that not only has parking been prepaid for all night but for the first hour of a.m. parking and also for the second hour of a.m. parking.

A modified parking meter is shown in FIG. 5 which eliminates the conventional type of timed meter and is directed to prepaid parking only. Upon pedestal 11, fragmentarily shown, is provided a hollow upright housing 77 having a windowed door 78 hinged at 79 with a suitable lock 46 the same as in FIGS. 1 and 3. Within housing 77 is a vertically movable frame 80, shown on dotted lines, which corresponds exactly to frame 16 above described in connection with FIG. 3. There is a coin receiver at 49, the same as in FIG. 1; and the operating mechanism for frame 80 is exactly the same as above described in FIG. 3.

This parking meter is limited to indicate prepaid parking, exclusive of user identification, and wherein no timing device is employed. Primarily here, on application of a suitable coin, such as for all day parking, the housing 80 would drop to position as shown at 81. The corresponding body 50 mounting indicia 82, shows through window 78 identifying the word "PAID" or "PAID-ALL DAY PARKING" indicating that the same has been prepaid.

Accordingly the present invention has the following possible usages:
(1) Effective in non-rush hours for fixed straight parking or all night parking with or without user identification.
(2) For prepaid parking with or without user identification.
(3) Separately constructed as a unit and mounted upon an actual parking meter for,
    (a) fixed rates at non-rush hours (with or without user identification),
    (b) for prepaid parking (with or without user identification).
(4) Built separately without time clock for fixed straight parking for long periods of time such as all day parking, with or without user identification.

The latter parking meter is inexpensively constructed and can be used for self-service parking lots to eliminate the constant need of an attendant and the bottleneck of traffic caused by having only one gate.

Having described my invention reference should now be had to the following claims. I claim:

1. In a parking meter, the invention comprising a housing on a pedestal; and a customer actuated prepaid parking indicating mechanism mounted within the housing and variably adjustable therein to visibly indicate the nature and extent of said prepaid parking; said indicating means including a support;
    an elongated, rotative body journaled on said support and having on its exterior surface a series of different indicia to show the nature and amount of prepaid parking paid for;
    a spring biased openable door having a window hinged on the housing opposite said body;
    a latching means normally maintaining the door closed;
    and a coin controlled means on the housing to release the latching means permitting manual opening of the door for access to said body.

2. In a parking meter, the invention comprising a housing on a pedestal and a customer actuated prepaid parking indicating mechanism mounted within the housing and variably adjustable therein to visibly indicate the nature and extent of said prepaid parking, said indicating means including a support;
    a hollow elongated frame slidably mounted within said housing for vertical movements;
    a series of vertically spaced parallel supports within said frame;
    an elongated rotative body journaled on each support and having on its exterior surface indicia to show the nature and amount of prepaid parking paid for;
    a spring biased door with a window hinged upon the housing opposite one of said bodies;
    and a spring biased releasable detent pivotally mounted on the housing supportably registerable with said frame to progressively present each body in front of said window;
    whereby a coin projected into said housing operatively engages said detent to momentarily release said frame permitting it to fall a short distance before re-engagement by said detent to successively present the next adjacent body to said window.

3. In the parking meter of claim 2, a stop pivotally mounted within said housing below said frame, normally positioned out of the path of movement of said frame, and manually movable to limit downward movement of the frame.

4. In the parking meter of claim 2, an elongated channel member secured upon each body opposite said window;
    said indicia including interchangeable cards removably supported upon said channels selectively, each card bearing indicia selected from the group consisting of "NITE," "PAID," "PAID FIRST HOUR," "PAID SECOND HOUR."

5. In the parking meter of claim 2, a latching means normally maintaining the door closed and locked;
    and a second normally locked door on said housing, openable by key to permit manual disengagement of said latching means.

6. In the parking meter of claim 2, and a customer actuated identification means within the housing variably adjustable to visibly indicate the user's license number, and including a series of parallel spaced rotatable wheels journaled on each support adjacent the body thereon; each wheel having upon its exterior peripheral edge a series of different digits or indicia.

7. In the parking meter of claim 2, and a customer actuated identification means within the housing variably adjustable to indicate the user's license number, and including a series of parallel spaced rotatable wheels journaled on each support adjacent the body thereon; each wheel having upon its exterior peripheral edge a series of different digits or indicia;
   a latching means normally maintaining the door closed and locked;
   and a second normally locked door on said housing, openable by a key to permit manual disengagement of said latching means.

References Cited by the Examiner
UNITED STATES PATENTS 2,593,191  4/1952  Rockola.
2,670,066  2/1954  Bruce.

RAPHAEL M. LUPO, *Primary Examiner.*
S. H. TOLLBERG, *Assistant Examiner.*